June 2, 1970 W. J. CAGLE 3,515,408
TRANSPORT AXLE ASSEMBLY

Filed April 1, 1968 2 Sheets-Sheet 1

INVENTOR
WESLEY J. CAGLE
BY Arthur J. Hansmann
ATTORNEY

June 2, 1970 W. J. CAGLE 3,515,408
TRANSPORT AXLE ASSEMBLY

Filed April 1, 1968 2 Sheets-Sheet 2

INVENTOR
WESLEY J. CAGLE
BY
Arthur J. Hansmann
ATTORNEY

United States Patent Office 3,515,408
Patented June 2, 1970

3,515,408
TRANSPORT AXLE ASSEMBLY
Wesley J. Cagle, Huntsville, Ala., assignor to J. I. Case Company, Racine, Wis., a corporation of Wisconsin
Filed Apr. 1, 1968, Ser. No. 717,820
Int. Cl. B62d 53/00
U.S. Cl. 280—415       8 Claims

ABSTRACT OF THE DISCLOSURE

A transport apparatus for a wide machine having a frame, ground wheels carrying the frame, and operational hitch means connected to the frame and convertible to a transport axle for supporting the machine in transporting position. The hitch is slidably moved to serve as a transport axle and two of the ground wheels are quickly detachable from the frame and connected to the axle. Lifting means are connected between the transport wheels and the frame for elevating the latter.

BACKGROUND OF THE INVENTION

It has been customary in the past, when transporting large machines or implements, to load the implements on tractor-trailers or to use implement carriers, wherein the machine is pulled or driven onto the trailer or carrier and the trailer is towed by a tractor or truck to another location. The use of tractor-trailers is generally feasible when transporting machines long distance. However, when moving an implement from one field to another or when transporting for short distances, it is not feasible nor economical to provide separate carrying or transporting means. The use of low-bed carriers has been generally acceptable for many of the implements. However, with the advent of longer or wider implements, the trailer or carrier has to be sufficiently large to carry the equipment. In some cases the large equipment has to be partially disassembled or knocked down to enable moving it from one location to another. The prior art shows quick detachable means for removal of the header from large combines or harvesters when transporting from field to field.

The prior art also shows the use of auxiliary wheels and an axle, the wheels being swingable by means of crank arms to a position for tdansporting an implement. This, of course, necessitates providing an axle and extra wheels when transporting the implement. It is therefore a desirable feature to utilize operational devices on an implement when transporting the implement from one location to another.

SUMMARY OF THE INVENTION

The present invention relates to the transporting of large implements and more particularly to apparatus usable in the operational position and convertible for use in the transport position. In the lengthwise transport of large machines, a trail-type toolbar implement will be described, wherein the toolbar may be 40 feet or more in operational width. The toolbar includes a plurality of ground wheels carrying the toolbar frame and hitch structure for towing by a vehicle, such as a tractor. At least two of the wheels are constructed to be quickly detachable from the main frame, wherein a wheel frame or wheel arms are connected to be usable in either the operational position or the transport position. The hitch structure is connected to the main fram such that one member of the hitch can be slidably moved rearwardly to a position for receiving the detachable wheels. The hitch includes brackets and a connecting link for coupling of the wheels to the rearwardly positioned structure wherein the rearwardly slid member now serves as an axle. A short hitch member is attached to one end of the frame, and, with a towing vehicle, the implement can be transported along roads or through gates. A pair of stands is also provided to support the frame while the wheels are changed from the operational position to the transport position. Also, lifting means are operative between the frame and the transport wheels to elevate the frame for transport.

It is to be noted that the invention shown and described herein provides a simple and economical means for moving a large machine or implement. The advantages and features of the present invention will become more apparent and also more clearly defined from a reading of the specification taken with the annexed drawings, in which.

DETAILED DESCRIPTION

Figure 1:
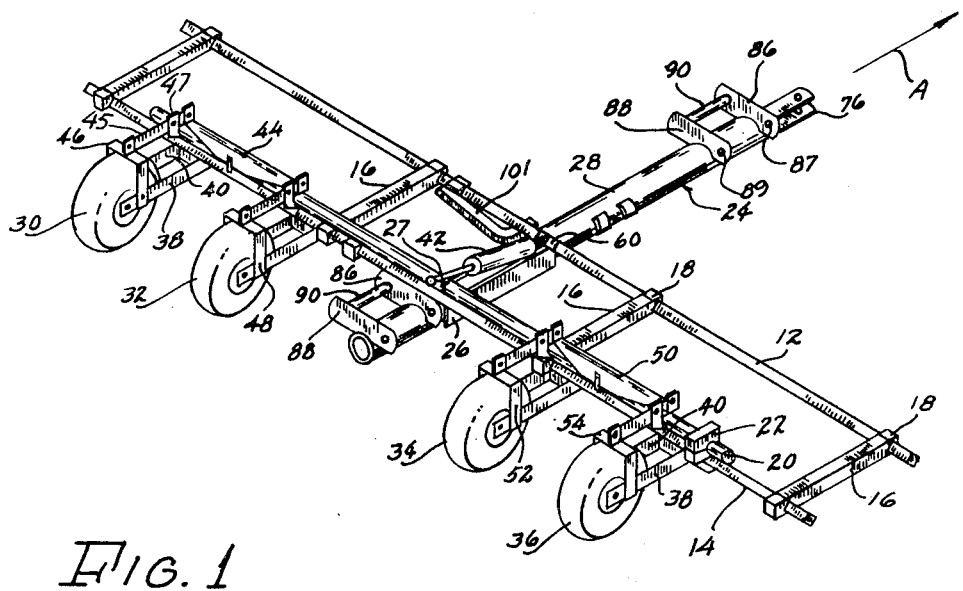
FIG. 1 is a perspective view of a trail-type toolbar showing the wheels and the hitch in the operational position.

As seen in FIG. 1, there is shown an implement frame having a front toolbar 12 and a rear bar 14 joined together by spaced tie members 16. Members 16 are secured to the bars by means of clamps 18 suitably bolted to the conventional square-shaped bar. A rockshaft 20 is journaled in suitable bearings 22, and the shaft is carried generally above bar 14. A hitch member 24 is provided to tow the implement in the direction of travel during operation, the direction being shown by the arrow A. Hitch member 24 includes a frame or box portion 26, suitably secured to bars 12 and 14 by means of brackets and U-bolts, and pipe member 28 carried by portion 26. The hitch and its construction will be described further in connection with FIG. 2.

Figure 3:
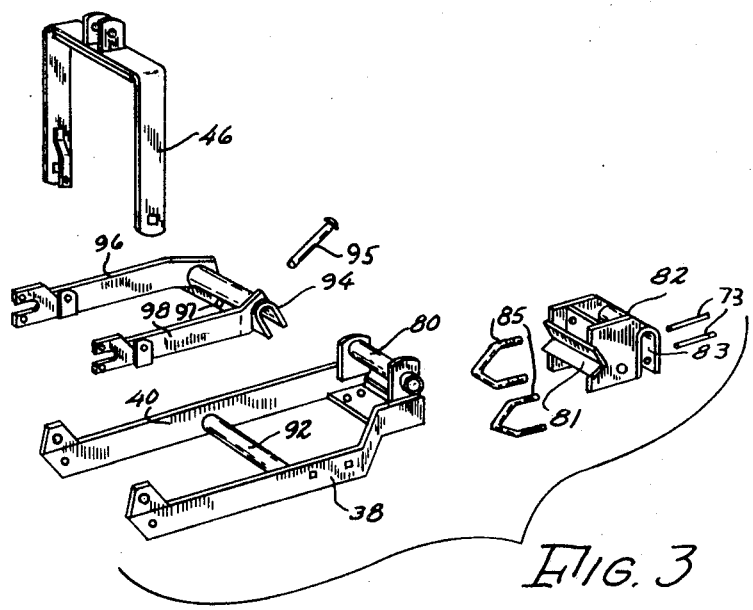
FIG. 3 is an exploded view showing the wheel supporting parts.

Ground wheels 30, 32, 34, and 36 are connected to rear bar 14 by means of wheel arms 38 and 40, shown in detail in FIG. 3, such that the wheels are free to move up and down to lower and raise the frame of the implement. The raising and lowering is accomplished by hydraulic means 42 comprising a piston and rod assembly connected to the hitch box portion 26 and to an arm 27 affixed to the rockshaft for rotating the shaft in the desired direction. This method of raising and lowering implements is, of course, well known to those skilled in the art. Connected between wheels 30 and 32 is a cross member 44 positioned on the rockshaft and pivotally attached to yokes 46 and 48. The yokes are pivotally connected to the wheel arms and to member 44 through pivot links 45 to allow the up-and-down movement of the wheels. Links 45 are pivoted on arms 47 affixed to the shaft 20. The wheels are spaced from each other and are independently supported so as to allow for equalizing the load on the wheels. The equalizing assembly, including the cross member 44, is the subject matter of U.S. Pat. application Ser. No. 699,706, filed Jan. 22, 1968; so will not be described further except as it relates to the present invention.

A member 50, like member 44, is connected between wheels 34 and 36 and is attached to yokes 52 and 54. The wheel arm structure and the attaching means for the wheels to the arm structure are different for wheels 30 and 36, compared to the structure and attaching means for wheels 32 and 34. This will be described in detail in relation to FIG. 3.

Figure 2:
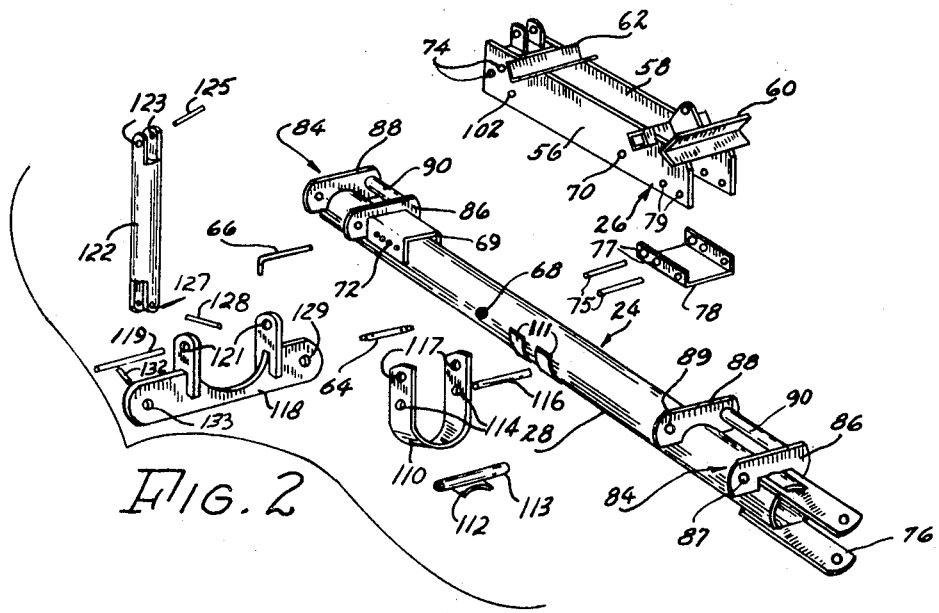
FIG. 2 is an exploded view showing the hitch parts.

FIG. 2 shows the hitch parts, including the portion 26 and the pipe member 28. Portion 26 is referred to as a box section comprising spaced plates 56 and 58 tied together by bracket elements 60 and 62 affixed to the plates 56 and 58 and formed to be secured to the toolbars 12 and 14 by means of U-bolts and clamps (not shown). Pipe member 28 fits between the plates 56 and 58, and is secured to the plates by a draft or pivot pin 64 and an adjusting pin 66. When the pipe member is in place in the box section, pin 64 is inserted in apertures 68 and 70, located in pipe 28 and plates 56 and 58, respectively. Pin 66 is inserted in one of the apertures 72 and 74, located in a bracket 69 affixed to pipe 28 and in plates 56 and 58, respectively. Pin 66 can be selectively positioned in one of the holes 72 and one of corresponding holes 74, the latter being on a radius around pivot pin 64. This provides a height adjustment for the hitch member in relation to the toolbar. Pipe member 28 includes hitch element 76 for connection to the towing vehicle (not shown). A keeper or channel bracket 78 is connected to box section 26 by means of pins 75 passing through holes 77 and 79, for added support after the pipe member is pinned in place by pins 64 and 66.

As shown in FIG. 3, the form of the yoke 46 is similar for all the ground wheels, however, the total construction for two of the wheel supports or frames is different from the other. A wheel arm structure including the arms 38 and 40 and a pivot member or bracket 80 are connected to the rear toolbar by means of support member 82 secured to the bar by U-bolts 85 and a formed clamp 81. The wheel frame comprising arms 38 and 40 is made in left and right hand to fit the appropriate sides of the machine. Member 82 includes a U-shaped portion 83 into which is inserted the pivot element 80, held by pins 73 passing under the element 80 to pivotally retain the latter so that the wheels move up and down in relation to the rockshaft and the bars. The outer wheels 30 and 36 include quick detachable support means wherein the wheels are normally used in the operational position for carrying the machine, and they are also adaptable for use in transporting, the latter use to be described later. The wheels are journaled on the wheel arms 38 and 40, and the yoke 46 is connected to the arms for supporting from the rockshaft. The ground wheel support assembly for wheels 30 and 36 is made to be quickly attachable and detachable from the toolbar when in the operating position.

Referring to FIG. 2, the pipe member 28 has wheel mounting means 84 affixed to each end of the member 28, and means 84 includes brackets or plates 86 and 88 permanently attached to the pipe 28, as by welding. These brackets are spaced from each other and extend to one side of the pipe where a pipe element or pivot 90 connects the extended portions. Plates 86 and 88 also include apertures 87 and 89 in the ends opposite pipe element 90, for use in the transport position.

FIG. 3 shows additional structure which is for the outer or transport wheels 30 and 36 to provide for the quick detachable function. A pipe element 92 connects arms 38 and 40 intermediate the ends thereof, and this is part of the quick detachable structure. The wheel arm-supporting structure for wheels 30 and 36 includes a U-shaped portion 94 connecting the arms 96 and 98. In the operational position, arms 38 and 40 are connected to the toolbar, the wheel is journaled on the arms, and portion 94 is placed over pipe 92 and secured thereto by a removable pin 95 passing through holes 97 and under pipe 92. Yoke 46 is pivotally connected to the wheel arms, and the wheel shaft is inserted in the ends of the arms to rotate therein.

Figure 4:
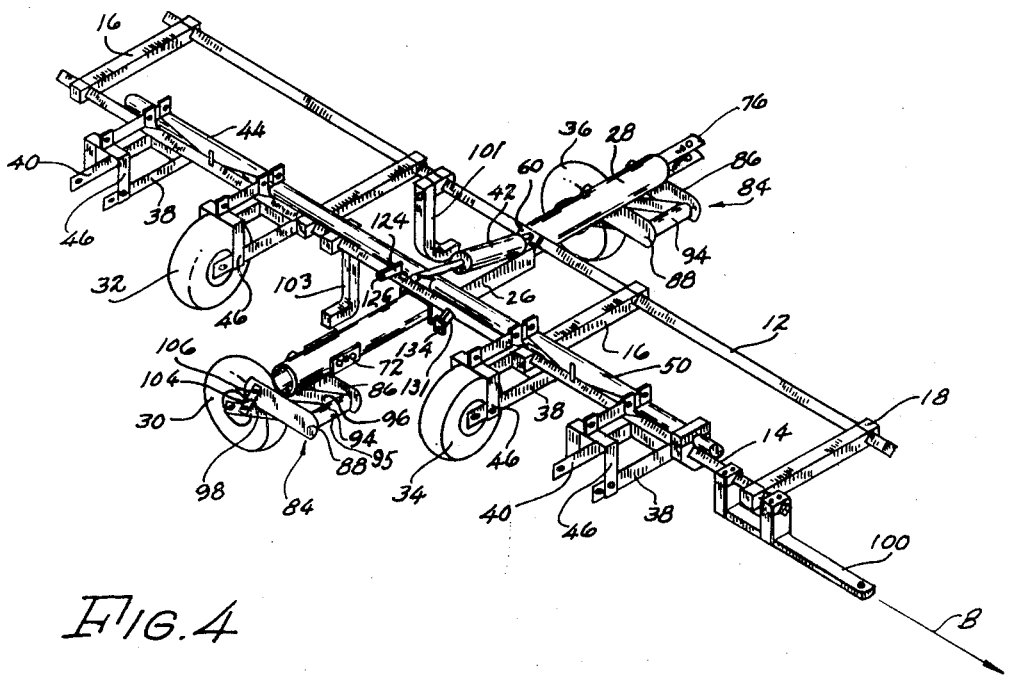
FIG. 4 is a similar view as FIG. 1 but showing the unit being readied for the transport position.

FIG. 4 shows the implement almost ready for transport. The toolbars 12 and 14, and the members 16, are included in the frame carrying the other parts as mentioned above. In this view, the pipe member 28 is shown in a different position from that shown in FIG. 1. The pipe member has been moved rearwardly in the box section 26 to now serve as an axle for transporting the implement. When the hitch member is converted to an axle member for transport, the member 28 is rotated 180 degrees, or otherwise inverted about its longitudinal axis, and is slidably moved rearwardly. The space brackets 86 and 88 extend to the right when the pipe is rotated, as compared to the left when the pipe is in the operating position.

When it is desired to change the implement from the operating to the transport position, the frame is raised by means of the hydraulic cylinder 42 wherein the piston rod is extended to rotate the rockshaft, the arms 47, and the pivot links 45, also the ground wheels are then forced downwardly. The machine is now in the raised position, and two stabilizing stands 101 and 103, pivotable on the frame, are lowered to the ground and latched in place. A transport hitch 100 is clamped to the rear toolbar as seen in FIG. 4, for transporting the implement in the direction of the arrow B. The hitch is formed so that the one end is at a height compatible with the tractor drawbar height when the implement is in the transport position. The operating hitch is unpinned from the tractor drawbar and the hydraulic system is then actuated to retract the piston rod in the cylinder which rotates the rockshaft and forces the ground wheels upwardly. As the wheels are raised from the ground, the frame is supported from the two stabilizing stands and the end of hitch 100.

Pins 64 and 66 are removed from the hitch pipe member and the box section 26, so that the hitch member 28 is free to be repositioned. The pipe member is rotated to a desired angle up to 180 degrees, and it is pushed rearwardly to a position where it is substantially centered across the frame. In FIG. 4, this centered position would be approximately the location of toolbar 14, however, there may be one or more toolbars for other operations, so the position of the hitch member as a transport axle depends upon the extent of the frame members. The hitch is now repositioned for use as the axle for transporting the implement.

The outside wheels 30 and 36 are quickly detachable by means of removing the U-shaped portion 94 from pipe element 92 and unpinning the wheel and its axle from arms 38 and 40. These wheels are then connected to the transport brackets on the ends of the transport axle by placing the U-shaped portion 94 on pipe 90, and pinning with pin 95, and pinning the opposite ends of arms 96 and 98 with the wheel attached thereto, to the plates 86 and 88 which contain the wheel on the transport axle. Struts 104 are connected between the wheel axle and a pin 106 which is inserted in apertures 87 and 89. The weight of the machine also provides for maintaining the wheels in the transport position as the machine is towed to the right, as in FIG. 4.

To permit raising of the unit when the transport wheels are in use, the arrangement is as described in the following. A U-shaped bracket 110 straddles the pipe 28 between pads 111 affixed to the pipe. An insert piece 112 is disposed between the legs of the bracket 110 to complete the encircling of the pipe 28, and to align a sleeve 113 with bracket holes 114. With the pipe 28 moved rearwardly, a pin 116 passes through holes 114, hole 102, and the sleeve 113 to secure all together in forming a bearing for rotation of the pipe about its longitudinal axis.

Next, pin 66 is reinserted into holes 117 in the bracket 110, and into holes 74 on opposite sides of the carrier 26. An arm 118 is pinned to the pipe 28 by a pin 119 going through holes 121 in the arm, and through the hole 68 in the pipe. Arm 118 is connected to the rockshaft 20 through a compression link 122 having pin holes 123 for connecting to a pivot link 124 on rockshaft 20 through pin 125 and pin hole 126 in arm 124. Link 122 has holes 127 for connecting to arm 118 by a pin 128 through arm hole 129.

After the pipe 28 is rotated under the influence of cylinder 42 to raise the unit, the arm 118 is held in the rotated position by being pinned to the bar 14. Thus an arm 131 affixed to the bar 14 is secured with the arm 118 by a pin 132 passing through a hole 133 in arm 118 and through a hole 134 in arm 131.

The rotation of the pipe 28 by the hydraulic piston placed the frame on the transport wheels. The raising of the frame also raises the transport hitch off the ground so that it can be connected to the tractor drawbar. The stabilizing stands and the other two ground wheels 32 and 34 were also raised from the ground by the raising of the frame, and the implement is ready for transport. The wheel arms 38 and 40 and the yokes 46 are left intact, being connected to the toolbar and to the rockshaft during transport of the implement.

It is thus seen that herein shown and described is an implement frame which includes portions convertible from operating to transport position. The operational hitch is converted to a transport axle and two of the ground wheels are easily and quickly detachable for use as transport wheels. The devices provide all the advantages and features of a transporting assembly wherein the implement is quickly converted from an operational to a transporting position.

Thus, this disclosure includes a novel method of converting an implement from the operational position to the transport position. Such method is fully disclosed herein in the commentary relating to the structural parts. Variations on the apparatus may occur to those skilled in the art and it is to be understood that all such variations are contemplated as being within the scope of the invention. The invention is not intended to be taken as limited by the embodiment disclosed, nor in fact, in any manner except as defined in the following claims.

What is claimed is:

1. In an agricultural implement of the type having a substantially wide frame for operation in the direction transverse to the width of said frame, means connected to said frame for towing the implement in the operational direction, a plurality of ground engaging wheels carrying the frame in the operational direction, a wheel axle connected to said frame and disposed centrally of the fore-and-aft axis of said implement in the operational direction, said wheel axle being slidably connected to said frame at the center of the width of said frame for transporting the implement in the direction of said frame width and transverse to the operational direction, at least some of said wheels being detachable from said frame and being connectable to said wheel axle for carrying the implement in a transport position, and a hitch member connected to one end of said frame for attaching to a propelling vehicle for towing said implement in the transport of said implement.

2. A means for transporting an implement having a relatively wide frame for operation in the direction transverse to the width of said frame, including a plurality of ground engaging wheels carrying the implement, a member connected to said frame and extending therefrom to the position on said frame in the direction of operation of said implement, said member being movably connected to said frame for movement rearwardly thereon relative to said direction of operation and to a transport position and being arranged for transporting said frame in the direction transverse to the direction of operation, wheel mounting means on said member to accommodate at least two of said wheels being detachable from said frame and connectable to said member, and a hitch connected to one end of said frame for towing said implement in the transport position.

3. The subject matter of claim 2, including means connectable between said member and said frame for moving said member with respect to said frame for downwardly displacing said wheels on said member, with respect to said frame, and thereby raise said frame.

4. The subject matter of claim 3, including means operatively connectable intermediate said frame and said wheels on said member, for securing said frame raised.

5. The subject matter of claim 2, including said member being rotatable on said frame in the transport position, said two wheels being located offset on said member for raising and lowering with respect to said member upon rotation of the later, and rotation means operative on said member for rotating the latter to raise and lower said frame relative to said two wheels.

6. The subject matter of claim 5, including wheel supports vertically movable mounted on said frame for movably mounting said wheels on said frame for moving said wheels up and down relative to said frame when said implement is in the operating position, and wherein said rotation means is a hydraulic cylinder operatively connected to all said wheels for raising and lowering said frame in both the operating position and the transport position.

7. A method of transporting an implement carried on a plurality of the wheels and having a substantially wide frame including an implement operation hitch connected to said frame and extending therefrom in the direction of operational travel of said implement, comprising the steps of disconnecting the hitch from its operational position, sliding said hitch on said frame to a central position thereon to present an axle for said frame, detaching a pair of the wheels from said frame, connecting said pair of said wheels to said axle, and attaching an implement transport hitch to one side of the frame, and towing said implement toward said one side and on said pair of said wheels.

8. A method in accordance with claim 7, including the additional step of rotating said axle on said frame in a direction to displace said pair of said wheels downwardly with respect to said frame, and when said axle is in the central position on said frame, for raising said frame for transporting.

References Cited
UNITED STATES PATENTS

| | | | |
|---|---|---|---|
| 1,963,426 | 6/1934 | Taylor | 280—411 |
| 2,672,721 | 3/1954 | Adams | 56—228 X |
| 2,736,567 | 2/1956 | McMurray | 280—34 |
| 2,833,105 | 5/1958 | Naery | 56—228 |

FOREIGN PATENTS 931,121  7/1963  Great Britain.

LEO FRIAGLIA, Primary Examiner

U.S. Cl. X.R.

56—228; 172—248; 280—34, 411